United States Patent
Fan et al.

(10) Patent No.: US 9,552,091 B2
(45) Date of Patent: Jan. 24, 2017

(54) DISPLAY DRIVING CIRCUIT, ARRAY SUBSTRATE AND TOUCH DISPLAY APPARATUS

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Jun Fan, Beijing (CN); Cheng Li, Beijing (CN); Jian Sun, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 0 days.

(21) Appl. No.: 14/908,813

(22) PCT Filed: Sep. 26, 2014

(86) PCT No.: PCT/CN2014/087597
§ 371 (c)(1),
(2) Date: Jan. 29, 2016

(87) PCT Pub. No.: WO2015/180334
PCT Pub. Date: Dec. 3, 2015

(65) Prior Publication Data
US 2016/0179258 A1  Jun. 23, 2016

(30) Foreign Application Priority Data
May 30, 2014  (CN) .......................... 2014 1 0240732

(51) Int. Cl.
*G06F 3/041* (2006.01)
*G06F 1/06* (2006.01)
(Continued)

(52) U.S. Cl.
CPC ............... *G06F 3/0412* (2013.01); *G06F 1/06* (2013.01); *G06F 3/044* (2013.01); *G06F 3/0416* (2013.01);
(Continued)

(58) Field of Classification Search
None
See application file for complete search history.

(56) References Cited

U.S. PATENT DOCUMENTS 7,576,583 B2 * 8/2009 Kuboyama .......... H03K 3/0375
327/202
2005/0289422 A1 * 12/2005 Lin ...................... G09G 3/3688
714/730

(Continued)

FOREIGN PATENT DOCUMENTS

| CN | 202996250 U | 6/2013 |
|---|---|---|
| CN | 103500551 A | 1/2014 |

(Continued)

OTHER PUBLICATIONS

International Search Report & written Opinion of the International Searching Authority Appln. No. PCT/CN2014/087597; Dated Mar. 11, 2015.

*Primary Examiner* — Viet Pham
*Assistant Examiner* — Christopher Kohlman
(74) *Attorney, Agent, or Firm* — Ladas & Parry LLP

(57) ABSTRACT

There is provided a display driving circuit, including: a touch signal terminal, a first clock terminal, a second clock terminal, a power supply terminal, a drive signal enabling terminal, a drive electrode signal terminal, a common electrode signal terminal, and a plurality of sub-circuits connected in cascades, each of the sub-circuits including: a logic unit, a driving unit and a transmission unit, wherein the logic unit is connected to the touch signal terminal, the first clock terminal, the second clock terminal, the power supply ter- (Continued)

minal, the drive signal enabling terminal, and the driving unit, the driving unit is connected to the transmission unit, and the transmission unit is connected to the drive electrode signal terminal and the common electrode signal terminal. The present application realizes co-electrode time-division multiplexing of the in-cell capacitive touch screen in the narrow-fame display apparatus.

18 Claims, 2 Drawing Sheets

(51) Int. Cl.
*G09G 3/20* (2006.01)
*G06F 3/044* (2006.01)

(52) U.S. Cl.
CPC ........ *G09G 3/2092* (2013.01); *G09G 2310/08* (2013.01); *G09G 2330/00* (2013.01)

(56) References Cited

U.S. PATENT DOCUMENTS

| 2014/0285466 A1* | 9/2014 | Hayashi | G06F 3/044 |
| | | | 345/174 |
| 2015/0145822 A1* | 5/2015 | Katsuta | G06F 3/044 |
| | | | 345/174 |

FOREIGN PATENT DOCUMENTS

| CN | 103700354 A | 4/2014 |
| CN | 103996371 A | 8/2014 |
| TW | 200601347 A | 1/2006 |
| WO | 2015180334 A1 | 3/2015 |

* cited by examiner

DISPLAY DRIVING CIRCUIT, ARRAY SUBSTRATE AND TOUCH DISPLAY APPARATUS

TECHNICAL FIELD

The present disclosure relates to a display driving circuit, an array substrate and a touch display apparatus.

BACKGROUND

As mobile products, for example products of a mobile phone, a tablet computer and so on, become thinner and more subtle, screen resolution is required to be higher and higher, and thickness of screen is required to be thinner and thinner. A conventional out-cell One Glass Solution (OGS) touch screen has already not met the requirement of market due to its disadvantages of thicker module, low optical transmittance, complicated structure and high manufacturing cost and so on. A thin and light in-cell touch display screen having a simple structure is increasingly called as a mainstream of market development.

A pixel structure of a display screen having a conventional structure comprises a common electrode and a pixel electrode. A touch screen having a conventional structure comprises an X-direction electrode (driving electrode) and a Y-direction electrode (sensing electrode). However, the in-cell touch screen takes the common electrode of the display screen as the driving electrode of the touch screen to perform time-division driving. Since wiring of the driving electrode of the conventional in-cell capacitive touch screen is output by a driving IC directly, the number of driving electrodes increases as the screen size becomes increasingly large, such that the wiring led from the driving IC terminal would increase correspondingly, which results in that it becomes more difficult to realize narrow frame.

SUMMARY

According to one aspect of the present disclosure, there is provided a display driving circuit, comprising: a touch signal terminal, a first clock terminal, a second clock terminal, a power supply terminal, a drive signal enabling terminal, a drive electrode signal terminal, a common electrode signal terminal and multiple sub-circuits connected in cascades, each of the multiple sub-circuits comprising: a logic unit, a driving unit and a transmission unit, wherein the logic unit is connected to the touch signal terminal, the first clock terminal, the second clock terminal, the power supply terminal, the drive signal enabling terminal and the driving unit, the driving unit is connected to the transmission unit, and the transmission unit is connected to the drive electrode signal terminal and the common electrode signal terminal;

The touch signal terminal is used to input a touch signal, the first clock terminal is used to input a first clock signal, the second clock terminal is used to input a second clock signal, the power supply terminal is used to input a power supply signal, the drive signal enabling terminal is used to input a drive enabling signal, the drive electrode signal terminal is used to input a drive electrode signal, and the common electrode signal terminal is used to input a common electrode signal;

A logical unit of each stage of sub-circuit is connected sequentially, and the logic unit is configured to control whether to gate a present stage of sub-circuit under the control of the touch signal terminal, the first clock terminal and the second clock terminal; if the present stage of sub-circuit is gated, then an operation period of time of a common electrode connected to the present stage of sub-circuit is controlled as a touch period of time, and the drive enabling signal is transmitted to the driving unit; if the present stage of sub-circuit is not gated, then the operation period of time of the common electrode connected to the present stage of sub-circuit is a display period of time, and the power supply signal is transmitted to the driving unit;

The driving unit is configured to drive a signal transmitted from the logic unit to reduce time delay produced in a process of signal transmission, and transmit a driven signal to the transmission unit;

The transmission unit is configured to output a drive electrode signal or a common electrode signal according to the driven signal; if the driven signal is a drive enabling signal, then the drive electrode signal is output; otherwise, the common electrode signal is output.

For example, the logic unit can comprise: a latch unit, a first transmission gate, a second transmission gate, a first thin film transistor, a second thin film transistor, a first inverter and a second inverter;

For a logic unit of an odd number stage of sub-circuit, the first clock terminal is connected to a first input terminal of a latch unit of the present stage of sub-circuit, and the second clock terminal is connected to an input terminal of the first transmission gate of the present stage of sub-circuit; for a logic unit of an even number stage of sub-circuit, the second clock terminal is connected to the first input terminal of the latch unit of the present stage of sub-circuit, and the first clock terminal is connected to the input terminal of the first transmission gate of the present stage of sub-circuit; the touch signal terminal is connected to a second input terminal of a latch unit of a first stage of sub-circuit, and the touch signal is transmitted to a second input terminal of a latch unit of a next stage of sub-circuit sequentially after being latched by the latch unit of the present stage of sub-circuit;

For a logic unit of each sub-circuit, an output terminal of the latch unit is connected to an input terminal of the first inverter and a first control terminal of the first transmission gate, an output terminal of the first inverter is connected to a second control terminal of the first transmission gate, an output terminal of the first transmission gate is connected to an input terminal of the second inverter and a first control terminal of the second transmission gate, an output terminal of the second inverter is connected to a second control terminal of the second transmission gate, the drive signal enabling terminal is connected to an input terminal of the second transmission gate, and an output terminal of the second transmission gate is connected to the driving unit; a gate of the first thin film transistor is connected to the output terminal of the first inverter, a source thereof is connected to the output terminal of the first transmission gate, and a drain thereof is connected to the power supply terminal; and a gate of the second thin film transistor is connected to the output terminal of the second inverter, a source thereof is connected to the output terminal of the second transmission gate, and a drain thereof is connected to the power supply terminal;

The latch unit is configured to latch the touch signal under the control of a clock terminal connected to the first input terminal of the latch unit; the first thin film transistor is configured to pull the output terminal of the first transmission gate to the power supply signal; and the second thin film transistor is configured to pull the output terminal of the second transmission gate to the power supply signal, and output the power supply signal to the driving unit.

The latch unit is further configured to transmit a latched touch signal to the first control terminal of the first transmission gate under the control of the clock terminal connected to the first input terminal of the latch unit, and transmit the latched touch signal to the second control terminal of the first transmission gate via the first inverter, to open the first transmission gate; the first transmission gate is used to transmit a clock signal connected to the first transmission gate to the first control terminal of the second transmission gate, and transmit the clock signal to the second control terminal of the second transmission gate via the second inverter, to open the second transmission gate; and the drive enabling signal passes through the second transmission gate to be transmitted to the driving unit;

Levels of the first clock signal and the second clock signal are opposite.

Alternatively, the driving unit comprises: an inverter group composed of at least two inverters connected in series, wherein a first inverter of the inverter group is connected to the output terminal of the second transmission gate, the inverter group is configured to drive a signal transmitted from the logic unit, to reduce time delay of signal transmission, and number of inverters in the inverter group is an even number.

Alternatively, the transmission unit comprises: a third transmission gate and a fourth transmission gate, wherein an input terminal of the third transmission gate is connected to the drive electrode signal terminal, an output terminal thereof is connected to the output terminal of the present stage of sub-circuit, a first control terminal thereof is connected to an output terminal of a last inverter in the inverter group, and a second control terminal thereof is connected to an input terminal of the last inverter; and an input terminal of the fourth transmission gate is connected to the common electrode signal terminal, an output terminal thereof is connected to the output terminal of the present stage of sub-circuit, a first control terminal thereof is connected to the input terminal of the last inverter, and a second control terminal thereof is connected to the output terminal of the last inverter;

The third transmission gate is used to output the drive electrode signal when the driving unit outputs a drive enabling signal; and the fourth transmission gate is used to output the common electrode signal when the driving unit outputs a power supply signal.

Alternatively, levels of the power supply signal and the drive enabling signal are opposite.

There is further provided according to another aspect of the present disclosure an array substrate, on which the display driving circuit described above is disposed. There is further provided in the present disclosure a touch display apparatus, comprising the array substrate described above.

The display driving circuit according to the embodiments of the present disclosure realizes co-electrode time-division multiplexing of the in-cell capacitive touch screen in the narrow-fame display apparatus.

DETAILED DESCRIPTION

Specific implementations of the present disclosure will be described in detail by combining with figures and embodiments. The embodiments described below are just used to explain principles of the present disclosure, but not used to limit the scope of the present disclosure.

Figure 1:
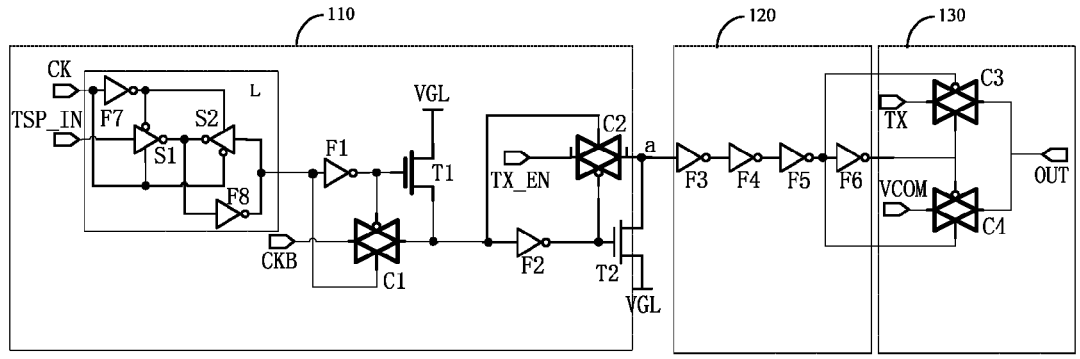
FIG. 1 is a schematic diagram of a display driving circuit according to an embodiment of the present disclosure, wherein a schematic diagram of a structure of a stage of sub-circuit is shown.

FIG. 1 schematically shows a structure of a stage of sub-circuit of a display driving circuit according to an embodiment of the present disclosure. As shown in FIG. 1, the circuit comprises: a touch signal terminal TSP_IN, a first clock terminal CK, a second clock terminal CKB, a power supply terminal VGL, a drive signal enabling terminal TX_EN, a drive electrode signal terminal TX, a common electrode signal terminal VCOM and multiple sub-circuits connected in cascades. In the embodiment as shown in FIG. 1, each of the multiple sub-circuits comprises: a logic unit 110, a driving unit 120 and a transmission unit 130. The logic unit 110 is connected to the touch signal terminal TSP_IN, the first clock terminal CK, the second clock terminal CKB, the power supply terminal VGL, the drive signal enabling terminal TX_EN and the driving unit 120. The driving unit 120 is connected to the transmission unit 130. The transmission unit 130 is connected to the drive electrode signal terminal TX and the common electrode signal terminal VCOM.

The touch signal terminal TSP_IN is used to input a touch signal, the first clock terminal CK is used to input a first clock signal, the second clock terminal CKB is used to input a second clock signal, the power supply terminal VGL is used to input a power supply signal, the drive signal enabling terminal TX_EN is used to input a drive enabling signal, the drive electrode signal terminal TX is used to input a drive electrode signal, and the common electrode signal terminal VCOM is used to input a common electrode signal.

Figure 2:
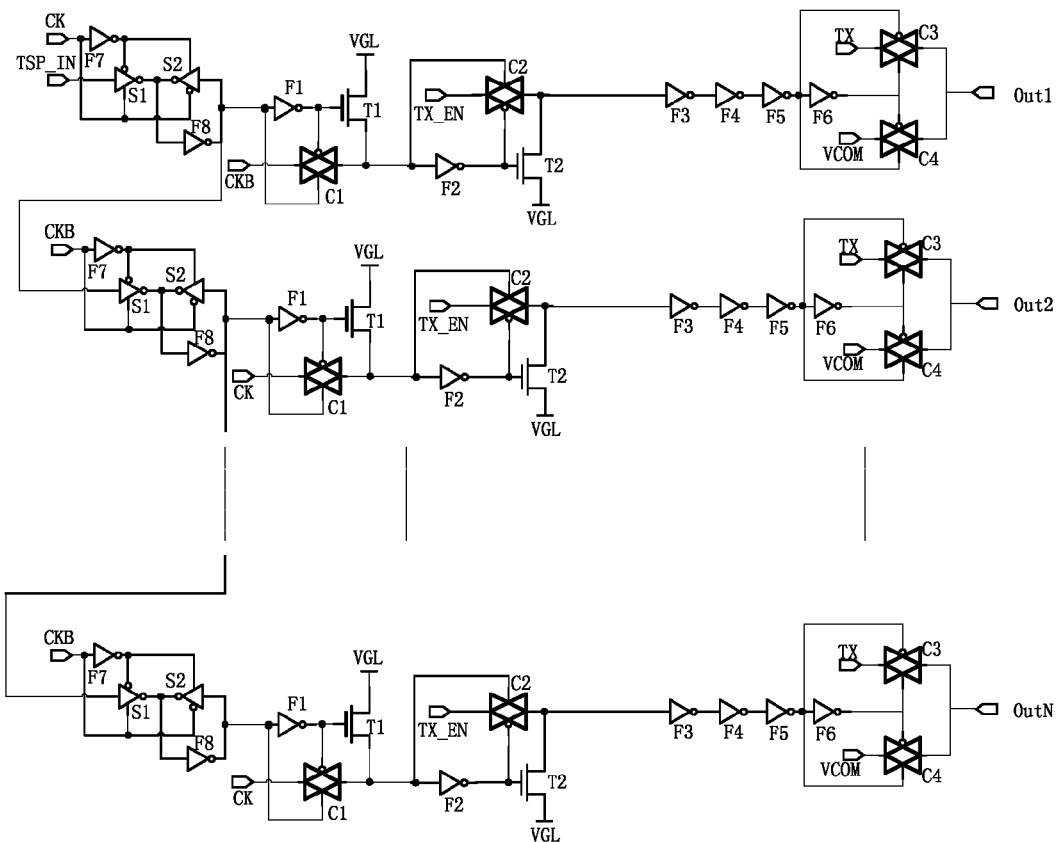
FIG. 2 is a schematic diagram of a cascade structure of N sub-circuits (the figure is the case where N is an even number) in FIG. 1.

FIG. 2 schematically shows a cascade structure of N sub-circuits (the figure is the case where N is an even number) in FIG. 1. As shown in FIG. 2, the logic unit 110 of each stage of sub-circuit is connected sequentially. The logic unit 110 is configured to control whether to gate the present stage of sub-circuit under the control of the touch signal terminal TSP_IN, the first clock terminal CK, and the second clock terminal CKB. When the present stage of sub-circuit is gated, an operating period of time of a common electrode (common electrode on the display panel) connected to the present stage of sub-circuit is controlled as a touch period of time, and the drive enabling signal is transmitted to the driving unit 12. When the present stage of sub-circuit is not gated, the operating period of time of the common electrode connected to the present stage of sub-circuit is a display period of time, and the power supply signal is transmitted to the driving unit 120.

The driving unit 120 is configured to process a signal transmitted from the logic unit 110 (this signal is likely to be a drive enabling signal or a power supply signal) to reduce time delay of signal transmission, and transmit the processed signal to the transmission unit 130.

The transmission unit 130 is configured to output a drive electrode signal or a common electrode signal according to a signal processed by the driving unit 120. If the signal processed by the driving unit 120 is the drive enabling signal, then the drive electrode signal is output; otherwise, the common electrode signal is output.

The display driving circuit provided in the embodiment of the present disclosure can be applicable to an in-cell capacitive touch display screen as a co-electrode drive signal scanning circuit. This circuit can realize time-division driving of a drive electrode scanning alternating signal used for touching and a normal display co-electrode direct current signal, finally realize the effect of the common electrode used as the drive electrode in a touch mode, and realize a touch reporting frequency which is two times a display refreshing frequency, such that the touch display screen has a characteristic of high signal to noise ratio (SNR), and at the same time a compatibility design of the touch and normal display of the circuit can be realized.

Additionally, in the prior art, wirings of respective drive electrodes and respective common electrodes in the prior art are connected to an external driver chip, so that corresponding signals are provided for respective electrodes through the external driver chip. In this case, there always include dozens of wirings of the drive electrodes. In order to reduce the delay of signal transmission caused by the wirings, the respective wirings are required to be relatively wide. Since there is a large amount of wirings, it needs to occupy a large area. However, the display driving circuit provided in the above embodiment of the present disclosure can be manufactured directly on a display substrate (for example, an array substrate) of a display apparatus, only if respective input terminals and respective output terminals (for example, including a touch signal terminal, a first clock terminal, a second clock terminal, a power supply terminal, a drive signal enabling terminal, a drive electrode signal terminal, and a common electrode signal terminal) are connected to the external driver chip. In this way, the occupation area of wirings of the respective driving electrodes and the respective common electrodes is greatly reduces, and thus the narrow-frame design can be realized.

To sum up, the display driving circuit is capable of realizing the co-electrode time-division multiplexing of the in-cell capacitive touch screen, with only a narrower frame. Meanwhile, the circuit can realize a high reporting frequency. For example, at a display scanning frequency of 60 Hz, the driving electrode can realize a scanning frequency of 120 Hz, so that a higher reporting frequency is realized.

In the embodiment as shown in FIG. 1, the logic unit 110 comprises: a latch unit L, a first transmission gate C1, a second transmission gate C2, a first thin film transistor T1, a second thin film transistor T2, a first inverter F1 (also called as a NOT gate) and a second inverter F2.

As shown in FIG. 2, for the logic unit 110 of an odd number stage of sub-circuit, the first clock terminal CK is connected to the latch unit L of the present stage of sub-circuit, and the second clock terminal CKB is connected to an input terminal of the first transmission gate C1 of the present stage of sub-circuit. For the logic unit 110 of an even number of sub-circuit, the second clock terminal CKB is connected to the latch unit L of the present stage of sub-circuit, and the first clock terminal CK is connected to the input terminal of the first transmission gate C1 of the present stage of sub-circuit. The touch signal terminal TSP_IN is connected to the latch unit L of a first stage of sub-circuit, and a touch signal is transmitted to the latch unit L of a next stage of sub-circuit after being latched by the latch unit L of the present stage of sub-circuit.

As shown in FIG. 1, for the logic unit 110 of each sub-circuit, the latch unit L is connected to an input terminal of the first inverter F1 and a first control terminal of the first transmission gate C1, an output terminal of the first inverter F1 is connected to a second control terminal of the first transmission gate C1, an output terminal of the first transmission gate C1 is connected to an input terminal of the second inverter F2 and a first control terminal of the second transmission gate C2, and an output terminal of the second inverter F2 is connected to a second control terminal of the second transmission gate C2. The drive signal enabling terminal TX_EN is connected to an input terminal of the second transmission gate C2, and an output terminal of the second transmission gate C2 is connected to the driving unit 120. In addition, a gate of the first thin film transistor T1 in the logic unit 110 is connected to the output terminal of the first inverter F1, a source thereof is connected to the output terminal of the first transmission gate C1, and a drain thereof is connected to the power supply terminal VGL; a gate of the second thin film transistor T2 is connected to the output terminal of the second inverter F2, a source thereof is connected to the output terminal of the second transmission gate C2, and a drain thereof is connected to the power supply terminal VGL.

The latch unit L is configured to latch the touch signal under the control of a clock terminal connected to the latch unit. When the touch signal is latched, the first thin film transistor T1 is configured to pull the output terminal of the first transmission gate C1 to the power supply signal (i.e., being the same as an output voltage of the power supply signal); the second thin film transistor T2 is used to pull the output terminal of the second transmission gate C2 to the power supply signal (i.e., being the same as the output voltage of the power supply signal), and output the power supply signal to the driving unit 120.

The latch unit L is further used to transmit the latched touch signal to the first control terminal of the first transmission gate C1 under the control of the clock terminal connected to the latch unit, and transmit the latched touch signal to the second control terminal of the first transmission gate C1 via the first inverter F1, to open the first transmission gate C1. The first transmission gate C1 is used to transmit a clock signal connected to the first transmission gate C1 to the first control terminal of the second transmission gate C2, and transmit the clock signal to the second control terminal of the second transmission gate C2 via the second inverter F2, to open the second transmission gate C2. The drive enabling signal passes through the second transmission gate C2 to be transmitted to the driving signal 120.

In order to control timing of respective stages of sub-circuits, levels of the first clock signal and the second clock signal are opposite.

In the embodiment, the driving unit 120 comprises: an inverter group composed of at least two inverters connected in series. As shown in FIGS. 1 and 2, the inverter group comprises 4 inverters (F3-F6). A first inverter F3 in the inverter group is connected to the output terminal of the second transmission gate C2, and the inverter group is configured to process a signal transmitted from the logic unit 110, to reduce signal delay in the transmission process. Exemplarily, in order to ensure the level of the signal unchanged, the number of inverters in the inverter group is an even number.

In the embodiment, the transmission unit 130 comprises: a third transmission gate C3 and a fourth transmission gate C4, an input terminal of the third transmission gate C3 is connected to the drive electrode signal terminal TX, an output terminal thereof is connected to the output terminal of the present stage of sub-circuit, a first control terminal thereof is connected to an output terminal of a last inverter F6 in the inverter group, and a second control terminal thereof is connected to an input terminal of the last inverter F6. An input terminal of the fourth transmission gate C4 is connected to the common electrode signal terminal VCOM, an output terminal thereof is connected to the output terminal of the present stage of sub-circuit, a first control terminal thereof is connected to an input terminal of the last inverter F6, and a second control terminal thereof is connected to the output terminal of the last inverter F6.

The third transmission gate C3 is used to output the drive electrode signal when a signal output by the driving unit 120 is a drive enabling signal; the fourth transmission gate C4 is used to output the common electrode signal when the signal output by the driving unit 120 is a power supply signal.

Exemplarily, in order to be able to decide outputting the drive electrode signal or the common electrode signal according to the power supply signal and the drive enabling signal, levels of the power supply signal and the drive enabling signal can be made opposite.

In the embodiment, the latch unit L can adopt any existing latch unit with two-input structure, and is not limited to the structure of the latch unit as shown in the figures of the present disclosure. The latch unit in FIGS. 1 and 2 comprises: a first tri-state gate S1, a second tri-state gate S2, a seventh inverter F7 and an eighth inverter F8. An input terminal of the seventh inverter F7 is a first input terminal of the latch unit, and a first input terminal of the first tri-state gate S1 is a second input terminal of the latch unit. An output terminal of the eighth inverter F8 is an output terminal of the latch unit. An output terminal of the seventh inverter F7 is connected to a third input terminal of the first tri-state gate S1 and a second input terminal of the second tri-state gate S2. The second input terminal of the first tri-state gate S1 is connected to the input terminal of the seventh inverter F7 and a third input terminal of the second tri-state gate S2, and the output terminal of the first tri-state gate S1 and the output terminal of the second tri-state gate S2 are connected together and connected to an input terminal of the eighth inverter F8. The output terminal of the eighth inverter 8 is connected to an input terminal of the second tri-state terminal S2.

Figure 3:
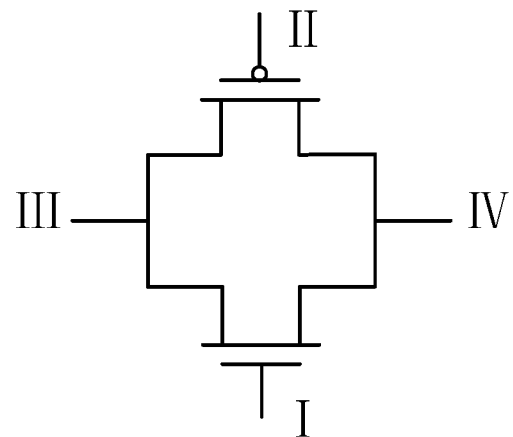
FIG. 3 is a schematic diagram of a specific structure of a transmission gate in FIG. 1.

FIG. 3 schematically shows a general structure of the transmission gate as shown in FIG. 1. As shown in FIG. 3, the transmission gate can be composed of two thin film transistors. A gate of a N-type thin film transistor is a first control terminal I, a gate of a P-type thin film transistor is a second control terminal II. Sources of the N-type and P-type thin film transistors are connected together to form an input terminal III, and drains thereof are connected together to form an output terminal IV.

Figure 4:
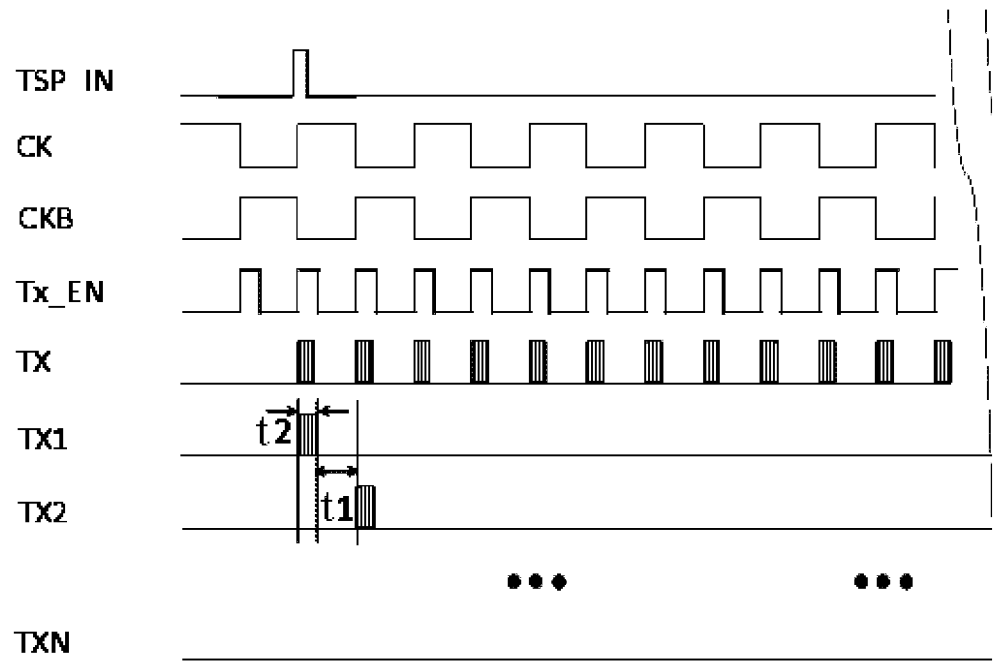
FIG. 4 is a timing diagram of a display driving circuit according to an embodiment of the present disclosure.

FIG. 4 schematically shows a timing diagram of a display driving circuit of the embodiment. An operation principle of the display driving circuit of the present embodiment will be described below by referring to the timing diagram as shown in FIG. 4 (it is described by taking T1 and T2 being N-type thin film transistors as an example).

Referring to the first and second stages of sub-circuits in FIGS. 1 and 2, when the TSP_IN signal and the CK signal are at a high level, the first stage of sub-circuit is gated and starts operating. The high level of the TSP_IN signal is transmitted to the output terminal of the latch unit L (i.e., the input terminal of the first inverter F1), and at the same time transmitted to an input terminal of the latch unit L of the second stage of sub-circuit. Since the levels of the CKB signal and the CK signal are opposite, the latch unit of the second stage of sub-circuit latches the high level of the TSP_IN signal, and of course it would not be transmitted to the next stage of sub-circuit. For the first stage of sub-circuit, since it is gated, the TSP_IN signal enables the first transmission gate C1 to be opened, the CKB signal passes through C1 and opens the second transmission gate C2, and the drive enabling signal (TX_EN signal, which is at the high level) passes through C2 and is transmitted to a node a. Now, the node a is at the high level and opens the third transmission gate C3 after passing through four inverters connected in series, so that the drive electrode signal is output. Since it is the drive electrode signal (Tx1 in FIG. 4) output to the common electrode, the common electrode performs the function of a drive electrode when touching is performed. That is, in one CK cycle, and within a period of time t2 that the TSP_IN signal is at the high level, the first stage of sub-circuit is gated, and the common electrode connected to the first stage of sub-circuit operates in a touch phase.

Since other stages of sub-circuits are not gated, the output terminal of the latch unit is in a low level state. After passing through the first inverter F1, the output terminal of the latch unit becomes the high level to turn on the transistor T1, and thus the output terminal of the first transmission gate C1 is pulled down to the power supply signal (low level). Likewise, the node a is also pulled down by T2 to the low level, and is still at the low level after passing through the four inverters F3-F6, which makes the fourth transmission gate C4 opened to output the common electrode signal. That is, in one CK cycle, and within the period of time t1 that the TSP_IN signal is at the low level, the common electrode connected to the sub-circuit not gated operates in a display phase.

Exemplarily, CKB and CK have a same duty ratio, and is 50%. At the same time, the two clock signals have a same pulse width but opposite levels. The time of the pulse width is a sum of a scanning time t2 (also referred to as a touch time) of a scan driving electrode that stops progressive display scanning for one time and a time t1 that performs normal progressive display. The scanning time t2 required by one driving electrode can be controlled by the pulse width of the Tx_EN signal, while the progressive display time t1 can be determined by the number of driving electrodes and resolution of the screen.

There is further provided in an embodiment of the present disclosure an array substrate on which the display driving circuit of the above embodiment is disposed.

The display driving circuit described above is disposed on the array substrate according to the embodiment of the present disclosure. Since the display driving circuit can be manufactured directly on the array substrate, it only needs to connect respective input terminals and respective output terminals (for example, including a touch signal terminal, a first clock terminal, a second clock terminal, a power supply terminal, a drive signal enabling terminal, a drive electrode signal terminal, and a common electrode signal terminal) to the external driver chip. In this way, occupation area of wirings of the respective driving electrodes and the respective common electrodes is greatly reduced, and thus the narrow-frame design can be realized.

There is further provided in an embodiment of the present disclosure a touch display apparatus, comprising the array substrate of the above embodiment.

The display apparatus of the embodiment of the present disclosure comprises the array substrate of the above embodiment, and can realize the narrow frame.

The above implementations are just used to describe the principle of the present disclosure, but not used to limit the technical solutions of the present disclosure. Those ordinary skilled in the art can make various alternations and modifications, without departing from the spirit and scope of the present disclosure. Therefore, all of these alternations and modifications as well as their equivalent technical solutions also belong to the scope of the present disclosure, and the patent protection scope of the present disclosure shall be defined by the claims.

The present application claims the priority of a Chinese patent application No. 201410240732.8 filed on May 30, 2014. Herein, the content disclosed by the Chinese patent application is incorporated in full by reference as a part of the present disclosure.

What is claimed is:

1. A display driving circuit, comprising:
   a touch signal terminal for inputting a touch signal;
   a first clock terminal for inputting a first clock signal;
   a second clock terminal for inputting a second clock signal;
   a power supply terminal for inputting a power supply signal;
   a drive signal enabling terminal for inputting a drive enabling signal;
   a drive electrode signal terminal for inputting a drive electrode signal;
   a common electrode signal terminal for inputting a common electrode signal; and
   a plurality of sub-circuits connected in cascades, wherein each of the sub-circuits comprises:
   a logic unit connected to the touch signal terminal, the first clock terminal, the second clock terminal, the power supply terminal, the drive signal enabling terminal, and configured to control whether to gate a present stage of sub-circuit under the control of the touch signal, the first clock signal, and the second clock signal;
   a driving unit connected to the logic unit, and configured to process a signal transmitted from the logic unit to reduce time delay produced in a process of signal transmission, and transmit the processed signal to the transmission unit; and
   a transmission unit connected to the drive electrode signal terminal and the common electrode signal terminal and connected to the driving unit, and configured to output a drive electrode signal or a common electrode signal according to the processed signal, if the processed signal is a drive enabling signal, then the drive electrode signal is output; otherwise, the common electrode signal is output; and
   wherein a logic unit of each stage of sub-circuit is connected sequentially, and when the present stage of sub-circuit is gated under the control of the logic unit, an operation period of time of a common electrode connected to the present stage of sub-circuit is controlled to be a touch period of time, and the drive enabling signal is transmitted to the driving unit; when the present stage of sub-circuit is not gated, the operation period of time of the common electrode connected to the present stage of sub-circuit is a display period of time, and the power supply signal is transmitted to the driving unit,
   wherein the driving unit comprises: an inverter group composed of at least two inverters connected in series, and a first inverter of the inverter group is connected to the output terminal of a second transmission gate.

2. The display driving circuit according to claim 1, wherein the logic unit comprises: a latch unit, a first transmission gate, the second transmission gate, a first thin film transistor, a second thin film transistor, a first inverter and a second inverter.

3. The display driving circuit according to claim 2, wherein for a logic unit of an odd number stage of sub-circuit, the first clock terminal is connected to a first input terminal of a latch unit of the present stage of sub-circuit, and the second clock terminal is connected to an input terminal of the first transmission unit of the present stage of sub-circuit, for a logic unit of an even number stage of sub-circuit, the second clock terminal is connected to the first input terminal of the latch unit of the present state of sub-circuit, and the first clock terminal is connected to the input terminal of the first transmission gate of the present stage of sub-circuit; the touch signal terminal is connected to a second input terminal of a latch unit of a first stage of sub-circuit, and the touch signal is transmitted to a second input terminal of a latch unit of a next stage of sub-circuit sequentially after being latched by the latch unit of the present stage of sub-circuit.

4. The display driving circuit according to claim 3, wherein for a logic unit of each sub-circuit, an output terminal of the latch unit is connected to an input terminal of the first inverter and a first control terminal of the first transmission gate, an output terminal of the first inverter is connected to a second control terminal of the first transmission gate, an output terminal of the first transmission gate is connected to an input terminal of the second inverter and a first control terminal of the second transmission gate, an output terminal of the second inverter is connected to a second control terminal of the second transmission gate, the drive signal enabling terminal is connected to an input terminal of the second transmission gate, and an output terminal of the second transmission gate is connected to the driving unit; a gate of the first thin film transistor is connected to the output terminal of the first inverter, a source thereof is connected to the output terminal of the first transmission gate, and a drain thereof is connected to the power supply terminal; and a gate of the second thin film transistor is connected to the output terminal of the second inverter, a source thereof is connected to the output terminal of the second transmission gate, and a drain thereof is connected to the power supply terminal.

5. The display driving circuit according to claim 2, wherein for a logic unit of each sub-circuit, an output terminal of the latch unit is connected to an input terminal of the first inverter and a first control terminal of the first transmission gate, an output terminal of the first inverter is connected to a second control terminal of the first transmission gate, an output terminal of the first transmission gate is connected to an input terminal of the second inverter and a first control terminal of the second transmission gate, an output terminal of the second inverter is connected to a second control terminal of the second transmission gate, the drive signal enabling terminal is connected to an input terminal of the second transmission gate, and an output terminal of the second transmission gate is connected to the driving unit; a gate of the first thin film transistor is connected to the output terminal of the first inverter, a source thereof is connected to the output terminal of the first transmission gate, and a drain thereof is connected to the power supply terminal; and a gate of the second thin film transistor is connected to the output terminal of the second inverter, a source thereof is connected to the output terminal of the second transmission gate, and a drain thereof is connected to the power supply terminal.

6. The display driving circuit according to claim 2, wherein the latch unit is configured to latch the touch signal under the control of a clock terminal connected to the first input terminal of the latch unit; the first thin film transistor is configured to pull the output terminal of the first transmission gate to the power supply signal; and the second thin film transistor is configured to pull the output terminal of the second transmission gate to the power supply signal, and output the power supply signal to the driving unit.

7. The display driving circuit according to claim 2, wherein the latch unit is further configured to transmit a latched touch signal to the first control terminal of the first transmission gate under the control of the clock terminal connected to the first input terminal of the latch unit, and transmit the latched touch signal to the second control terminal of the first transmission gate via the first inverter, to open the first transmission gate; the first transmission gate is used to transmit a clock signal connected to the first transmission gate to the first control terminal of the second transmission gate, and transmit the clock signal to the second control terminal of the second transmission gate via the second inverter, to open the second transmission gate, and the drive enabling signal passes through the second transmission gate to be transmitted to the driving unit.

8. The display driving circuit according to claim 1, wherein levels of the first clock signal and the second clock signal are opposite.

9. The display driving circuit according to claim 1, wherein number of inverters in the inverter group is an even number.

10. The display driving circuit according to claim 1, wherein the transmission unit comprises: a third transmission gate and a fourth transmission gate, an input terminal of the third transmission gate is connected to the drive electrode signal terminal, an output terminal thereof is connected to the output terminal of the present stage of sub-circuit, a first control terminal thereof is connected to an output terminal of a last inverter in the inverter group, and a second control terminal thereof is connected to an input terminal of the last inverter; and an input terminal of the fourth transmission gate is connected to the common electrode signal terminal, an output terminal thereof is connected to the output terminal of the present stage of sub-circuit, a first control terminal thereof is connected to the input terminal of the last inverter, and a second control terminal thereof is connected to the output terminal of the last inverter;

the third transmission gate is configured to output the drive electrode signal when the driving unit outputs a drive enabling signal; and the fourth transmission gate is configured to output the common electrode signal when the driving unit outputs a power supply signal.

11. An array substrate, on which the display driving circuit according to claim 1 is disposed.

12. A touch display apparatus, comprising the array substrate according to claim 11.

13. The display driving circuit according to claim 11, wherein the logic unit comprises: a latch unit, a first transmission gate, the second transmission gate, a first thin film transistor, a second thin film transistor, a first inverter and a second inverter.

14. The array substrate according to claim 13, wherein for a logic unit of an odd number stage of sub-circuit, the first clock terminal is connected to a first input terminal of a latch unit of the present stage of sub-circuit, and the second clock terminal is connected to an input terminal of the first transmission unit of the present stage of sub-circuit, for a logic unit of an even number stage of sub-circuit, the second clock terminal is connected to the first input terminal of the latch unit of the present state of sub-circuit, and the first clock terminal is connected to the input terminal of the first transmission gate of the present stage of sub-circuit; the touch signal terminal is connected to a second input terminal of a latch unit of a first stage of sub-circuit, and the touch signal is transmitted to a second input terminal of a latch unit of a next stage of sub-circuit sequentially after being latched by the latch unit of the present stage of sub-circuit.

15. The array substrate according to claim 13, wherein for a logic unit of each sub-circuit, an output terminal of the latch unit is connected to an input terminal of the first inverter and a first control terminal of the first transmission gate, an output terminal of the first inverter is connected to a second control terminal of the first transmission gate, an output terminal of the first transmission gate is connected to an input terminal of the second inverter and a first control terminal of the second transmission gate, an output terminal of the second inverter is connected to a second control terminal of the second transmission gate, the drive signal enabling terminal is connected to an input terminal of the second transmission gate, and an output terminal of the second transmission gate is connected to the driving unit; a gate of the first thin film transistor is connected to the output terminal of the first inverter, a source thereof is connected to the output terminal of the first transmission gate, and a drain thereof is connected to the power supply terminal; and a gate of the second thin film transistor is connected to the output terminal of the second inverter, a source thereof is connected to the output terminal of the second transmission gate, and a drain thereof is connected to the power supply terminal.

16. The array substrate according to claim 13, wherein the latch unit is configured to latch the touch signal under the control of a clock terminal connected to the first input terminal of the latch unit; the first thin film transistor is configured to pull the output terminal of the first transmission gate to the power supply signal; and the second thin film transistor is configured to pull the output terminal of the second transmission gate to the power supply signal, and output the power supply signal to the driving unit.

17. The array substrate according to claim 13, wherein the latch unit is further configured to transmit a latched touch signal to the first control terminal of the first transmission gate under the control of the clock terminal connected to the first input terminal of the latch unit, and transmit the latched touch signal to the second control terminal of the first transmission gate via the first inverter, to open the first transmission gate; the first transmission gate is used to transmit a clock signal connected to the first transmission gate to the first control terminal of the second transmission gate, and transmit the clock signal to the second control terminal of the second transmission gate via the second inverter, to open the second transmission gate, and the drive enabling signal passes through the second transmission gate to be transmitted to the driving unit.

18. The display driving circuit according to claim 11, wherein the transmission unit comprises: a third transmission gate and a fourth transmission gate, an input terminal of the third transmission gate is connected to the drive electrode signal terminal, an output terminal thereof is connected to the output terminal of the present stage of sub-circuit, a first control terminal thereof is connected to an output terminal of a last inverter in the inverter group, and a second control terminal thereof is connected to an input terminal of the last inverter; and an input terminal of the fourth transmission gate is connected to the common electrode signal terminal, an output terminal thereof is connected to the output terminal of the present stage of sub-circuit, a first control terminal thereof is connected to the input terminal of the last inverter, and a second control terminal thereof is connected to the output terminal of the last inverter;

the third transmission gate is configured to output the drive electrode signal when the driving unit outputs a drive enabling signal; and the fourth transmission gate is configured to output the common electrode signal when the driving unit outputs a power supply signal.

\* \* \* \* \*